Jan. 2, 1934.  C. S. HALL  1,941,799
AIRCRAFT PROPELLING AND CONTROLLING MECHANISM
Filed July 25, 1932  5 Sheets-Sheet 1
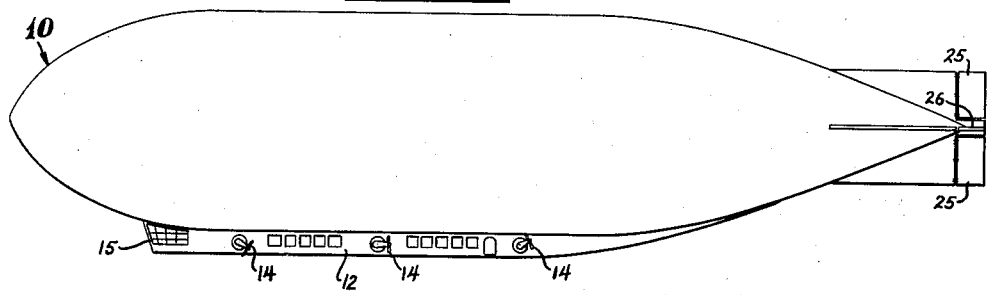
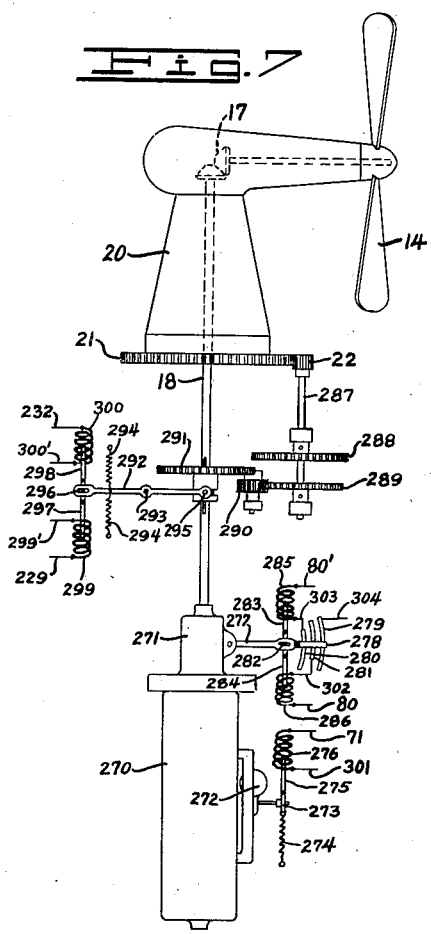
INVENTOR.
CHARLES S. HALL.
BY B. J. Craig
ATTORNEY.

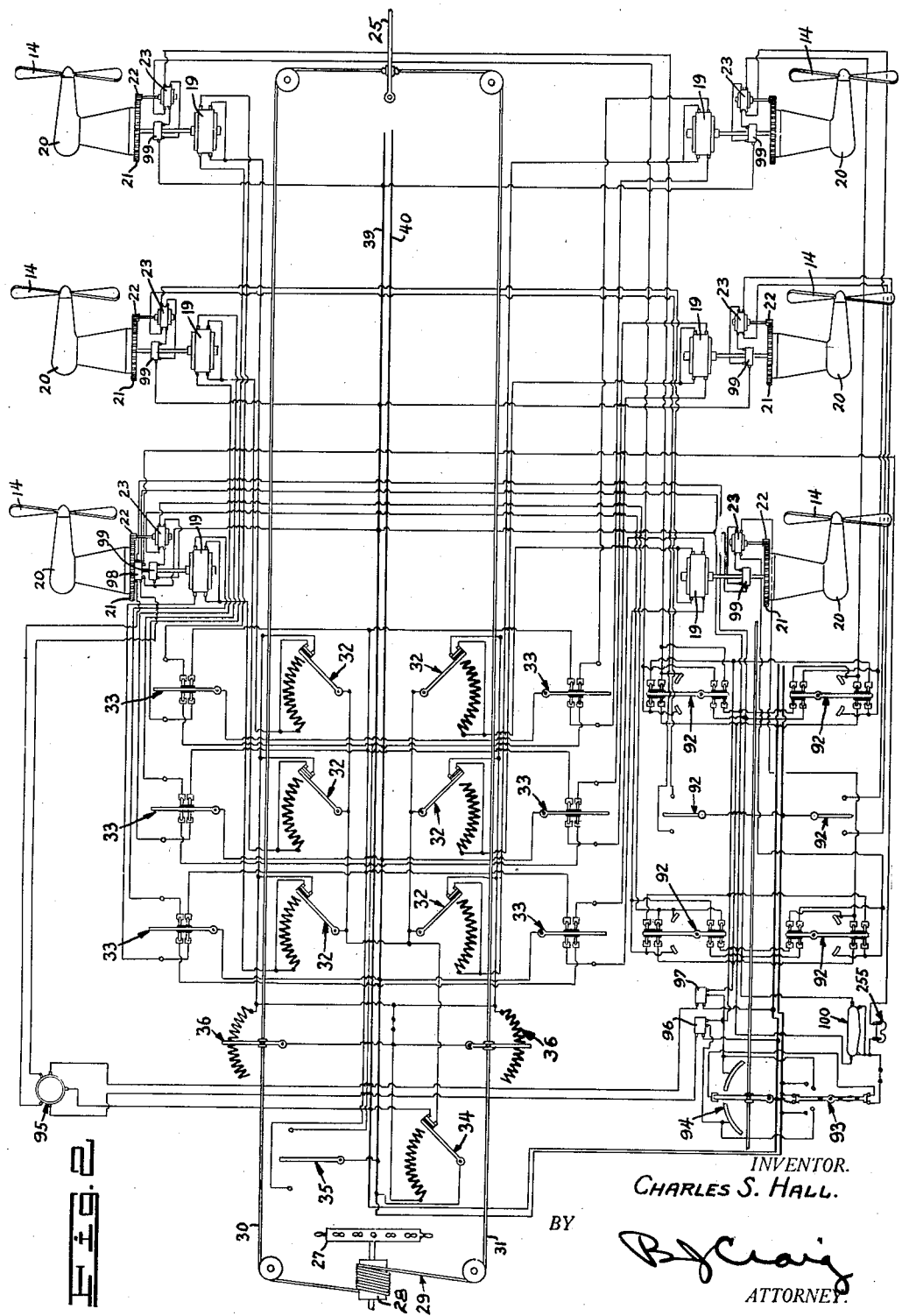

Jan. 2, 1934. C. S. HALL 1,941,799
AIRCRAFT PROPELLING AND CONTROLLING MECHANISM
Filed July 25, 1932 5 Sheets-Sheet 3
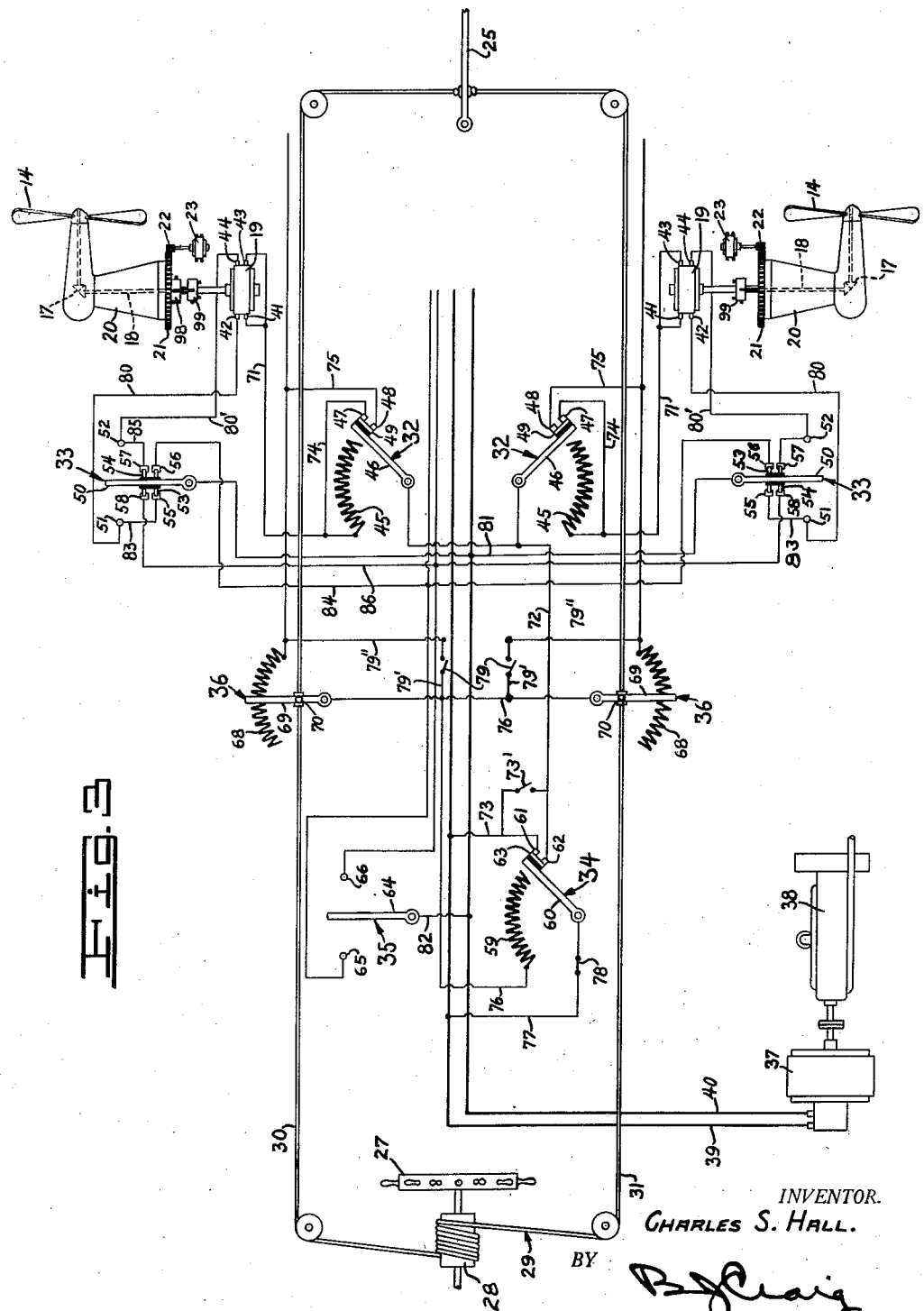
INVENTOR.
CHARLES S. HALL.
BY
ATTORNEY.

Jan. 2, 1934.   C. S. HALL   1,941,799
AIRCRAFT PROPELLING AND CONTROLLING MECHANISM
Filed July 25, 1932   5 Sheets-Sheet 4
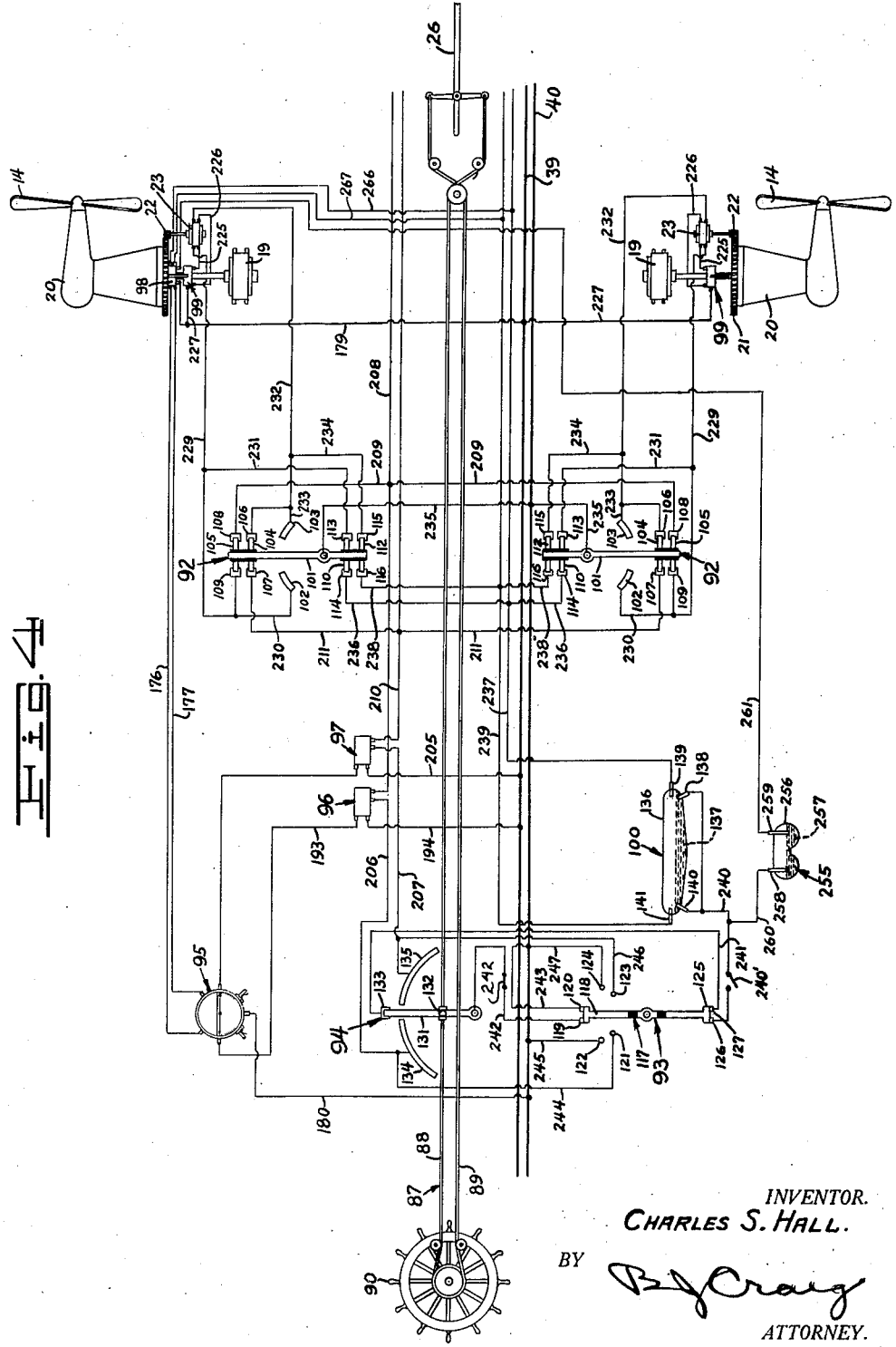
INVENTOR.
CHARLES S. HALL.
BY B J Craig
ATTORNEY.

Jan. 2, 1934.  C. S. HALL  1,941,799
AIRCRAFT PROPELLING AND CONTROLLING MECHANISM
Filed July 25, 1932   5 Sheets-Sheet 5
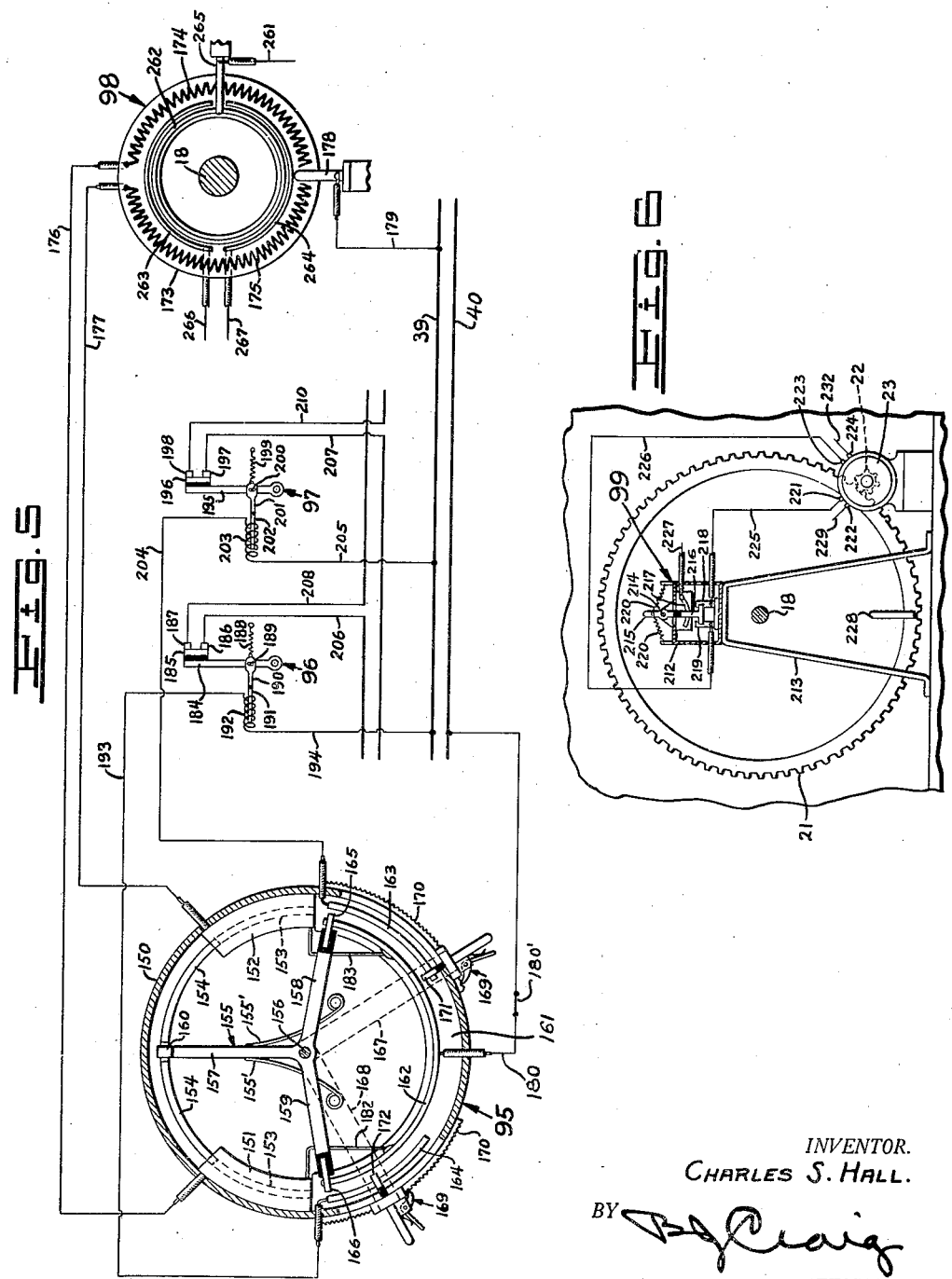
INVENTOR.
CHARLES S. HALL.
BY
ATTORNEY.

Patented Jan. 2, 1934

1,941,799

UNITED STATES PATENT OFFICE 1,941,799

AIRCRAFT PROPELLING AND CONTROLLING MECHANISM

Charles S. Hall, Los Angeles, Calif.

Application July 25, 1932. Serial No. 624,426

14 Claims. (Cl. 244—25)

This invention relates to aircraft propelling and controlling mechanism.

The general object of the invention is to provide an improved means for controlling the propulsion of a lighter-than-air or a heavier-than-air aircraft.

A more specific object of the invention is to provide a dirigible aircraft having a plurality of driving propellers and wherein novel means is provided for actuating the propellers to aid in maneuvering the aircraft.

Another object is to provide an aircraft comprising a body having a plurality of propellers thereon and wherein automatic means is provided for controlling the speed and direction of thrust of the propellers.

Another object of the invention is to provide an aircraft having propellers and having a rudder and wherein automatic means is provided whereby when the rudder is shifted the propellers are simultaneously shifted.

Another object of the invention is to provide an aircraft having an elevator with means whereby when the elevator is shifted the propellers are also shifted.

Another object of the invention will be apparent from the foregoing description taken in connection with the accompanying drawings wherein:

Fig. 1 is a side elevation of a lighter-than-air craft embodying the features of my invention.

Fig. 2 is a diagrammatic layout of my automatic steering and elevating mechanism for air craft.

Fig. 3 is a diagrammatic layout of the master control and two sets of individual propeller control units as used in conjunction with the steering portion of my invention.

Fig. 4 is a similar view of the elevation control portion of the invention.

Fig. 5 is a fragmentary sectional view of the propeller angle set device and showing the device diagrammatically wired to its associated operating parts.

Fig. 6 is a fragmentary sectional view showing the propeller housing turning stop device and showing it diagrammatically wired to its associated motor.

Fig. 7 is a diagrammatic view showing the means of operating a propeller unit in accordance with my invention when an internal combustion engine is used to actuate the propeller.

Referring to the drawings by reference characters I have illustrated my invention as applied to an aircraft shown as a dirigible 10. The aircraft 10 includes a machinery and passenger carrying cabin 12 on which propellers 14 are mounted. Three propellers are shown on the port side and three on the starboard side of the aircraft. The aircraft has a control cabin 15 from which the maneuvering of the aircraft is controlled and from which all of the propellers may be controlled.

The propeller mechanism shown in this application is preferably the same as shown and described in my copending application now Patent No. 1,868,975 issued July 26, 1932, to which reference may be made for details of construction. It will be understood, however, that any type of construction of propeller units suitable for carrying out this invention may be used.

As all of the individual propeller control systems shown are the same, I will only describe one of the systems in detail, and will describe the manner in which all the systems are connected to the master controls.

As shown in Fig. 3 each propeller 14 is driven by means of bevel gears 17 which are in turn driven by a shaft 18 from a prime mover shown as an electric motor 19. The propeller is mounted on a housing 20 which may be revolved to change the angle of thrust of the propeller. To revolve the housing 20 I show a gear 21 mounted thereon which meshes with a pinion gear on the armature shaft of a prime mover shown as an electric motor 23.

For altering the direction of travel of the aircraft the craft includes the usual rudders 25 and elevators 26.

For actuating the rudder 25 I have shown a steering wheel 27 which is preferably located in the control cabin 15. The steering wheel 27 is adapted to rotate a drum 28 on which a plurality of turns of a cable 29 are positioned. The cable 29 includes two reaches 30 and 31 which extend rearwardly and are connected to the rudder one on each side. Thus when the wheel 27 is rotated one reach of the cable will move in one direction and the other reach will move in the opposite direction.

It is my desire to provide means whereby when the rudder is actuated to turn the aircraft the rotation of the propellers on the side in the direction which the aircraft is turning will be automatically slowed down and the rotation of the propellers on the opposite side will be speeded up thus materially assisting in the turning of the air craft.

For controlling the speed of each of the motors 19 I provide an individual speed control switch indicated generally at 32 and for controlling the direction of rotation of the motor shaft 18 I provide an individual forward and reverse switch indicated generally at 33.

For simultaneously controlling the speed of all the motors 19 I provide a master speed control switch indicated at 34 and for similarly controlling the direction of rotation of all the motors 19 I provide a master forward and reverse switch indicated at 35. For automatically controlling the speed of all the motors 19 for the purpose of causing the propellers to assist in turning the aircraft I provide automatic speed control switches 36.

As shown electric current for operating the motors 19 and 23 is furnished by an electric generator unit 37 which is shown as driven by an internal combustion engine 38. A positive wire 39 and a negative wire 40 extend from the generator and convey electric current to the various units.

All the individual switches 32 and 33 and the master switches 34 and 35 are preferably located in the control cabin 15 while the automatic switches 36 may be located in any convenient position.

Each of the motors 19 include a set of terminals 41 and 42 and a set of terminals 43 and 44. When electric current passes through the terminals 41 and 42 the motor is adapted to rotate the propeller in a direction to drive the aircraft forward and when current passes through the terminals 43 and 44 the motor is adapted to rotate the propellers in the opposite direction to drive the aircraft rearwardly.

Each of the individual speed control switches 32 includes a rheostat coil 45, a pivoted contact arm 46 which is adapted to engage the rheostat coil 45 and a pair of contacts 47 and 48. Mounted on and insulated from the contact arm 46 I provide a contact bar 49 which in one position of the arm 46 is adapted to bridge the contacts 47 and 48. The contacts 47 and 48 are positioned adjacent the low end of the rheostat coil 45 and when the contact bar 49 bridges the contacts 47 and 48 the contact arm 46 is out of engagement with the rheostat coil 45 and when the contact arm 46 engages the rheostat coil 45 the contact bar 49 is out of engagement with the contacts 47 and 48.

The individual forward and reverse control switches 33 each include a pivoted contact arm 50 and a pair of contacts 51 and 52, spaced one to each side of the contact arm 50 and adapted to be engaged separately by the arm 50. Mounted on and insulated from the arm 50 I provide a pair of spaced contact bars 53 and 54.

When the contact arm 50 is in a neutral position intermediate the contacts 51 and 52 the contact bar 53 is adapted to bridge a pair of contacts 55 and 56 and the contact bar 54 is adapted to bridge a pair of contacts 57 and 58. When the contact bar 50 is moved into engagement with one of the contacts 51 or 52 the contact bars 53 and 54 do not bridge their associated pairs of contacts.

The master speed control switch 34 includes a rheostat coil 59, a pivoted contact arm 60 which is adapted to engage the rheostat coil 59 and a pair of contacts 61 and 62. Mounted on and insulated from the contact arm 60 I provide a contact bar 63 which in one position is adapted to bridge the contacts 61 and 62. The contacts 61 and 62 are positioned adjacent the low end of the rheostat coil 59 and when the contact bar 63 bridges the contacts 61 and 62 the contact arm 60 is out of engagement with the rheostat coil 59 and when the contact arm 60 engages the rheostat coil 59 the contact bar 63 is out of engagement with the contacts 61 and 62.

The master forward and reverse control switch 35 includes a pivoted contact arm 64 and a pair of contacts 65 and 66, spaced one on each side of the contact arm and adapted to be engaged by the contact arm 64.

Each of the automatic speed control switches 36 includes a rheostat coil 68 which is adapted to be engaged by a pivoted contact arm 69. The contact arm 69 of one of the switches is connected in any suitable manner as at 70 to the reach 30 of the steering cable 29 and the contact arm 69 of the other switch is similarly connected to the reach 31 of the steering cable 29.

When the rudder 25 is in a straight fore and aft position the contact arms 69 of both switches 36 are adapted to engage their associated rheostat coils 68 at a point intermediate the high and low end of the rheostats as shown in Fig. 3.

When the rudder is moved to turn the aircraft the contact arm 69 secured to the reach of the cable 29 on the side towards which the aircraft is turning swings towards the low end of its associated rheostat coil and the contact arm 69 of the switch on the opposite side swings towards the high end of its associated rheostat.

The contacts 41 and 43 of each of the propeller drive motors 19 are connected by a wire 71 to their associated rheostat coils 45 at the end opposite the contacts 47 and 48. The arms 46 are each connected by a wire 72 to the contact 62 of the master speed control switch 34 and the contact 61 thereof is connected by a wire 73 to the positive feed wire 38.

A manually operated switch 73' is connected across the wires 72 and 73 to allow the current to be directed between the wires 72 and 73 when the contact bar 63 is free from the contact members 61 and 62. By closing the switch 73' it is possible to control the current going to any one of the motors by its individual control switch 32 while the remaining motors are still being controlled by the master control switch 34.

The contact 47 of each of the individual speed control switches 32 is connected by a wire 74 to the wire 71 associated therewith. The contacts 48 of all the switches 32 which are associated with the motors 19 on one side of the aircraft are connected by a wire 75 to the rheostat coil 68 of the automatic speed control switch 36 which is located on the same side and the contacts 48 of the switches 32 associated with the motors 19 on the opposite side of the aircraft are similarly connected to their associated switch 36.

The contact arms 69 of each of the automatic speed control switches 36 are connected by a wire 76 to the rheostat coil 59 of the master speed control switch 34 at the end opposite the contacts 61 and 62. The contact arm 60 of the switch 34 is connected by a wire 77 to the positive feed wire 39 which may have a switch 78 interposed therein.

From the foregoing it will be apparent that when the switch 78 is closed and the switches 32 are in the positions shown wherein the contact bars 49 bridge the contacts 47 and 48 and the contact arm 60 of the master switch 34 is moved into engagement with the rheostat coil 59 electric current will be directed from the positive feed wire 39 through the wire 77 and the switch 78 to the contact arm 60. From the contact arm 60 the current will be directed through the rheostat coil 59 to the wire 76 and therethrough to the contact arms 69 of the automatic speed control switches 36. From the contact arms 69 the current will be directed through the wires 75 to the contacts 48 of the switches 32. From a contact 48 the current is directed through the contact bar 49 to the contact 47 and thence through the wire 74 and through the wire 71 to the contacts 41 and 43 of the associated motor 19.

The return flow of the current from the motors to the negative feed wire 40 is directed through the forward and reverse control switches 33 and 35 as will be fully described hereinafter.

From the foregoing it will be apparent that when the contact arm 60 of the master switch 34 is moved along the rheostat coil 59 towards the wire 76 more current will be directed to the motors 19 causing faster operation thereof and when the arm 60 is moved in the opposite direction less current will be directed to the motors 19 thereby causing slower operation thereof.

As previously stated when the rudder 25 is in a straight fore and aft position the contact arms 69 of the automatic speed control switches 36 engage their respective rheostat coils 68 intermediate the high and low ends thereof so it will be apparent that as the current passes through the contact arms 69 and the rheostat coils 68 the same amount of electrical energy will be directed to the motors 19 on each side of the aircraft whereupon all the propellers 14 will be rotated at the same speed. When the rudder is moved to turn the aircraft the contact arm 69 of the switches 36, on the side towards which the aircraft is turning, will be moved towards the low end of the rheostat thereby directing less current to the motors 19 on the side towards which the aircraft is turning. At the same time the contact arm 69 of the switch 36 on the opposite side will move towards the high end of the rheostat thereby directing more current to the motors on the side of the aircraft away from the side towards which it is turning. By thus slowing down the propellers on the side towards which the aircraft is turning and speeding up the propellers on the opposite side a quicker turn and a turn causing less strain on the rudder and its associated parts is obtained.

To cut out the effect of the automatic speed control switches 36 I provide switches 79. One side of each switch is connected by a wire 79' with the wire 76 and the opposite side by a wire 79'' to each of the wires 75. Normally the switches 79 are open to allow the automatic speed control switches 36 to effect the operation of the motors. When it is desired to cut out the effect of the switches 36 the switches 79 are closed thereby shutting the current from the wires 76 around the rheostat coils 68 directly to the wires 75 whereupon actuation of the switches 36 will not effect the operation of the motors 19.

The forward terminal 42 of each of the propeller drive motors 19 is connected by a wire 80 to the contact 51 of its associated individual forward and reverse control switch 33, and the reverse terminal 44 of the motors 19 are connected by a wire 80' to the terminal 52 of their associated switches 33. The contact arm 50 of the switches 33 are connected by a wire 81 to the negative feed wire 40 and a wire 82 connects the contact arm 64 of the master switch 35 to the negative feed wire 40. From the foregoing it will be apparent that when the contact arm 50 of the switch 33 engages the contact 51 the flow of current from the motor 19 will be from the forward terminal 42 through the wire 80 to the contact 51 thence through the contact arm 50 and the wire 81 to the negative feed wire 40 whereupon the motor 19 will operate to rotate the propeller 14 in a direction to drive the aircraft forwardly. When the contact arm 50 of the switch 33 engages the contact 52 the current from the motor 19 is directed from the reverse terminal 44 through the wire 80' to the contact 52 and thence through the contact arm 50 and the wire 81 to the negative feed wire 40 whereupon the motor 19 will operate to rotate the propeller 14 in a direction to drive the aircraft rearwardly.

The forward contact 51 of the individual switches 33 is connected by a wire 83 to the contact 55 and its associated contact 56 is connected by a wire 84 to the forward contact 65 of the master switch 35. The reverse contact 52 of the switches 33 is connected by a wire 85 to the contact 57 and its associated contact 58 is connected by a wire 86 to the reverse contact 66 of the master switch 35. Thus it will be apparent that when the individual switches 33 are in a neutral position, intermediate the contacts 51 and 52, the contact bars 53 and 54 bridge their associated contacts and the contact arm 64 of the master switch 35 is moved into engagement with forward contact 65 the current from the motors 19 will be directed from their forward terminals 42 through the wires 80 to the forward contacts 51 of the switches 33. From the contacts 51 the current is directed through the wires 83 to the contacts 55 thence through the contact bars 53 to the contacts 56 and then through the wires 84 to the forward contact 65 of the master switch 35 and thence through the contact arm 64 and the wire 82 to the negative feed wire 40 whereupon all the motors 19 will operate to rotate the propellers 14 in a direction to drive the aircraft forwardly. When the contact arm 64 of the master switch 35 engages the reverse contact 66 the current from the motors 19 is directed from the reverse terminals 44 through the wires 80' to the contacts 52 of the switches 33 and thence through the wires 85 to the contacts 57, through the contact bars 54 to the contacts 58 and thence through the wires 86 to the reverse contact 66 of the master switch 35 and then through the contact arm 64 and the wire 82 to the negative feed wire 40 whereupon all the motors 19 operate to rotate the propellers 14 in a direction to drive the aircraft rearwardly.

When the contact arm 50 of one of the switches 33 is moved into engagement with either the forward contact 51 or the reverse contact 52 the contact bars 53 and 54 do not bridge their associated sets of contacts 55 and 56 and 57 and 58 whereupon actuation of the master switch 35 will not effect the operation of the motor 19 associated with the particular switch 33 which has been operated to a forward or reverse position.

In Fig. 4 I have shown the operation of the elevators 26 as being controlled by a cable 87 which includes an upper reach 88 and a lower reach 89 and the cable 87 is shown as adapted to be operated by a wheel 90.

It is also my desire to provide means whereby when the elevators are tilted to change the plane of the flight of the dirigible the angle of thrust of the propellers 14 will be automatically altered to assist the elevators.

For operating each of the propeller housing turning motors 23 I provide an individual control switch indicated generally at 92 and for operating all the motors 23 in unison I provide a master hand switch indicated at 93 and for automatically operating the motors 23 in unison in conjunction with the operation of the elevators 26 I provide an automatic switch indicated at 94. For predetermining the angle at which the propeller housings 20 will stop when they are set to turn by means of the master hand switch 93 I provide an angle set device 95 which operates in conjunction with a pair of relay switches 96 and 97 and a rheostat switch 98 which is located adjacent one of the propeller housings 20. To prevent the propeller housings 20 from continuing to turn in case the devices 95, 96 or 97 should fail to properly function I provide adjacent each of the propeller housings a cut out switch 99.

For automatically maintaining the aircraft on an even keel longitudinally I provide a mercury switch indicated at 100.

As shown each of the switches 92 include a contact arm 101 which is pivoted intermediate its length. Intermediate the pivotal point of the arm 101 and one end thereof I provide a pair of contacts 102 and 103 which are spaced one on each side of the contact arm and are adapted to be singly engaged by the arm 101. Adjacent one end of the arm 101 I provide a pair of spaced contact bars 104 and 105 which are insulated from the arm 101. The contact bar 104 is adapted to bridge a pair of contacts 106 and 107 and the contact bar 105 is adapted to bridge a pair of contacts 108 and 109. Adjacent the opposite end of the arm 101 I provide a pair of contact bars 110 and 112 which are insulated from the arm 101. The contact bar 110 is adapted to bridge a pair of contacts 113 and 114 and the contact bar 112 is adapted to bridge a pair of contacts 115 and 116.

When the arm 101 is in a neutral position between the contacts 102 and 103 as shown in Fig. 4, the contact bars 104, 105, 110, 112 bridge their associated sets of contacts and when the arm 101 is moved into engagement with either the contact 102 or 103 the contact bars 104, 105, 110 and 113 do not bridge their associated sets of contacts.

The master hand switch 93 includes a contact arm 117 which is pivoted intermediate its length and comprises adjacent one end a contact portion 118 which is adapted to bridge a pair of contacts 119 and 120. Spaced on each side of the contact portion 118 and adapted to be engaged thereby I provide two sets of contacts 121 and 122 and 123 and 124. At the opposite end of the arm 117 I provide a contact portion 125 which is adapted to bridge a pair of contacts 126 and 127. The contact portions 118 and 125 are insulated from each other.

When the arm 117 is in a neutral position intermediate the contacts 121, 122 and 123 and 124 as shown in Fig. 4, the contact portions 118 and 125 bridge their associated sets of contacts and when the arm is moved to a position wherein the contact portion 118 bridges either the contacts 121 and 122 or the contacts 123 and 124 the contact portion 118 moves out of engagement with the contacts 119 and 120 and the contact portion 125 does not bridge its set of contacts.

The automatic switch 94 includes a pivoted contact arm 131 which is suitably secured as at 132 to the reach 88 of the cable 87. The contact arm 131 when in a neutral position as shown in Fig. 4 is adapted to engage a contact 133. Spaced one on each side of the contact arm 131 I provide contact tracks 134 and 135.

From the foregoing it will be apparent that when the upper reach 88 of the cable 87 is moved to shift the elevators 26 the arm 131 of the switch 94 will be swung about its pivotal point.

When the contact arm 131 is in a neutral position it does not engage the contact tracks 134 and 135 and when it is moved into engagement with either the contact track 134 or the contact track 135 it does not engage the contact 133.

The automatic switch 100 includes a container 136 which contains a quantity of mercury indicated at 137. At one end of the container I provide a pair of contacts 138 and 139 and at the opposite end I provide a similar pair of contacts 140 and 141. The container is so arranged that when the aircraft is on an even longitudinal keel the mercury 137 does not bridge either set of contacts but when the aircraft tilts longitudinally in one direction beyond a predetermined angle the mercury bridges the contacts 140 and 141 and when it tilts beyond a predetermined angle in the opposite direction it bridges the contacts 138 and 149.

The construction of the angle set device 95 is shown in detail in Fig. 5. As shown the device 95 includes a housing 150 in which a pair of spaced solenoid windings 151 and 152 are positioned. The solenoids 151 are positioned on opposite sides of the housing and arcuately shaped longitudinally and each includes an aperture 153 in which a solenoid core 154 is positioned. Positioned in the housing 150 I provide a member 155 which is pivotally mounted as at 156 and includes an arm 157 and a pair of oppositely extending arms 158 and 159. For resiliently retaining the member 155 in a neutral position I provide a pair of opposed spring members 155' which are anchored to the casing 150 and engage opposite sides of the arm 157.

The solenoid cores 154 are each secured to the arm 157 as at 160. Positioned in the housing 150 below the solenoids I provide an arcuate member 161 of insulating material on which I provide an electrical conductive contact track 162 and a pair of spaced apart contact tracks 163 and 164. Mounted on the arm 158 and insulated therefrom I provide a contact bar 165 which is adapted to engage the contact track 162 and on the arm 159 I provide a similar contact bar 166. Pivotally mounted on the pivot 156 I provide arms 167 and 168 each of which include a latch mechanism 169 which is adapted to engage a ratchet toothed rack 170 to retain the arms in various adjusted positions.

Mounted on the arm 167 and insulated therefrom I provide a contact bar 171 which engages the contact track 163 and on the arm 168 I provide a similar contact bar 172 which engages the contact track 164. The contact bar 165 on the member 155 and the contact bar 171 on the arm 167 are adapted upon sufficient movement to engage each other and the contact bar 166 on the member 155 and the contact bar 172 of the arm 168 are adapted to similarly engage each other.

The rheostat switch 98 includes an insulated base 173 which is mounted on a stationary bracket (not shown) adjacent the rotatable housing 20 of one of the propeller units. Mounted on the base 173 and extending approximately half way around in a clockwise direction I provide a rheostat winding 174 and extending approximately half way around in counter-clockwise direction I provide a similar rheostat winding 175. One end of the rheostat coil 174 is connected by a wire 176 to the solenoid 151 of the angle set device 95 and one end of the rheostat coil 175 is connected by a wire 177 to the solenoid 152. Mounted on the rotatable propeller housing 20 and normally positioned between the opposite ends of the rheostat coils 174 and 175 I provide a contact bar 178 which when the housing 20 rotates in one direction or the other is adapted to engage one of the other of the rheostat coils 173 or 174. The contact bar 178 of the rheostat switch 98 is suitably connected by a wire 179 to the positive feed wire 39 and the contact track 162 is connected by a wire 180 to the negative feed wire 40. A wire 182 electrically connects the contact track 162 and the solenoid 151 and a wire 183 similarly connects the contact track 162 and the solenoid 152.

The switch 96 includes an arm 184 pivoted adjacent one end and having mounted thereon and insulated therefrom adjacent the opposite end a contact bar 185 which is adapted to bridge a pair of contacts 186 and 187. Secured to the arm 184 intermediate the length thereof I provide a coiled spring 188 which is adapted to resiliently retain the contact bar 185 in engagement with the contacts 186 and 187. Slackly connected to the arm 184 intermediate the length thereof as at 189 I provide a bar 190 which includes a solenoid core 191 which is adapted to be acted upon by a solenoid winding 192. One end of the solenoid winding 192 is connected by a wire 193 to the contact track 164 of the device 95 while the opposite end of the solenoid winding 192 is connected by a wire 194 to the positive wire 39.

The switch 97 includes an arm 195 pivoted adjacent one end and having mounted thereon and insulated therefrom adjacent the opposite end a contact bar 196 which is adapted to bridge a pair of contacts 197 and 198. Secured to the arm 195 intermediate the length thereof I provide a coiled spring 199 which is adapted to resiliently retain the contact bar 196 in engagement with the contacts 197 and 198. Slackly connected to the arm 195 intermediate the length thereof as at 100 I provide a bar 210 which includes a solenoid core 202 which is adapted to be acted upon by a solenoid winding 203. One end of the solenoid winding 203 is connected by a wire 204 to the contact track 163 of the device 95 while the opposite end of the solenoid winding 203 is connected by a wire 205 to the positive feed wire 39.

The contact 186 of the switch 96 is connected by a wire 206 to the contact track 134 of the switch 94 while the contact 197 of the switch 97 is connected by a wire 207 to contact track 135 of the switch 94. The contact 187 of the switch 96 has a lead wire 208 connected thereto which is connected by wires 209 to the contact 108 of each of the individual switches 92 while the contact 198 has a lead wire 210 connected thereto which is connected by wires 211 to the contacts 107 of each of the individual switches 92.

As shown in Fig. 6 each of the switches 99 includes a housing 212 which is mounted on a support 213 adjacent its associated propeller housing. Pivotally mounted intermediate its length on the housing as at 214 I provide an arm 215 which includes a contact portion 216. Adjacent the arm 215 I provide a contact track 217 and a pair of spaced contacts 218 and 219. In the normal position of the arm 215 the contact portion 216 thereof is adapted to engage the contact track 217 and both of the contacts 218 and 219. To resiliently retain the arm 215 in a normal position I provide a pair of oppositely extending coiled springs 220 one end of each of which is secured to the arm 215 and the opposite ends are suitably anchored to the housing 212. Each of the motors 23 include a pair of terminals 221 and 222 and a pair of terminals 223 and 224. The terminal 221 of the motor 23 is connected by a wire 225 to the contact 218 of the switch 98 and the terminal 223 of the motor 23 is connected by a wire 226 to the contact 219 of the switch 99 and the switch contact track 217 is connected by a wire 227 to the positive feed wire 39.

From the foregoing it will be apparent that when the arm 215 is in a normal position current from the positive feed wire 39 may flow to either of the terminals 221 or 223 of the motor 23. The direction the motor will rotate depends on which of the circuits associated with the other terminals 222 or 224 is closed through to the negative feed wire 40 as will be described thereinafter.

Secured to the gear 21 of the propeller housing I provide a finger 228 which when the propeller is in a normal horizontal position to exert a rearward thrust is positioned opposite the arm 215 of the switch 99 as shown in Fig. 6. When the circuit to the terminal 222 of the motor 23 is completed to the negative feed wire 40 the motor will rotate the gear 21 in a clockwise direction the finger 228 travels upward and will engage the upper end of the arm 215 whereupon continued movement thereof will swing the arm 215 about its pivot whereupon the contact portion 216 of the arm will move out of engagement with the contact 218 thereby breaking the circuit to the motor 23 through the wire 225 whereupon the motor will stop. When the arm 215 is in this position the contact portion 216 thereof remains in contact with the contact track 217 and the contact 219 whereupon when the circuit to the terminal 224 of the motor 23 is completed to the negative feed wire 40 the motor 23 will rotate the gear 21 in a counter clockwise direction thereby moving the finger 228 out of engagement with the arm 215 whereupon the arm 215 will return to its normal position. If the gear 21 continues to rotate the finger 228 will engage the opposite side of the arm 215 and swing it about its pivot in the opposite direction from that previously described and break the circuit through the wire 226 to the motor terminal 223 in the same manner as previously described.

The terminal 222 of each of the motors 23 is connected by a wire 229 to the contact 109 of its associated individual control switch 92. The contact 108 of each of the switches 92 are connected by the wire 210 to the lead wire 218 which is connected to the contact 187 of the switch 96 as previously described. A wire 230 connects the wire 229 and the contact 102 of the switch 92 and a wire 231 connects the wire 229 and the contact 113 of the switch 92.

The terminal 224 of each of the motors 23 is connected by a wire 232 to the contact 106 of its associated individual control switch 92. The contact 107 is connected by the wire 211 to the wire 210 which is connected to the contact 198 of the switch 97 as previously described. A wire 233 connects the wire 232 and the contact 103 of the switch 92 and a wire 234 connects the wire 232 and the contact 115 of the switch 92. The contact arm 101 of each of the individual switches 92 is connected by a wire 235 to the negative feed wire 40. The contact 114 of each of the individual switches 92 is connected by a wire 236 to a lead wire 237 which is connected to the terminal 139 of the mercury switch 100 and the contact 116 of each of the switches 92 is connected by a wire 238 to a lead wire 239 which is connected to the terminal 141 of the mercury switch 100. The contact 138 and 140 of the mercury switch 100 are connected by a wire 240 having a switch 240' interposed therein to the contact 126 of the master hand switch 93 and the contact 127 thereof is connected by a wire 241 to the contact 133 of the automatic control switch 94. The contact arm 131 of the switch 94 is connected by a wire 242 to the contact 119 of the master hand switch 93 and the contact 120 thereof is connected by a wire 243 to the negative feed wire 40. The contact track 134 of the automatic switch 94 is connected by a wire 244 to the contact 121 of the switch 93 and the contact 122 thereof is connected by a wire 245 to the negative feed wire 40. The contact track 135 of the automatic switch 94 is connected by a wire 246 to the contact 123 of the switch 93 and the contact 124 thereof is connected by a wire 247 to the negative feed wire 40.

In operation when the wheel 90 is rotated to cause the aircraft to move downward the contact arm 131 of the automatic switch 94 is moved into engagement with the contact track 134 whereupon electric current will flow from the positive feed wire 39 through the wire 227 to the contact track 217 of the switch 99 and thence through the contact arm 216 thereof through the contact 218 and then through the wire 225 to the terminal 221 of the motor 23. From the motor terminal 222 the current will return to the negative wire 40 through the wire 229 to the contact 109 of the individual switch 92, thence through the contact bar 105 thereof to the contact 108 from which it will flow through the wire 209 to the lead wire 208 to the contact 187 of the relay switch 96. From the contact 187 the current flows through the contact bar 185 to the contact 186 and thence through the wire 206 to the contact track 134 of the automatic switch 94, thence through the contact arm 131 thereof and the wire 242 to the contact 119 of the master hand switch 93. From the contact 119 the current flows through the contact bar 118 to the contact 120 and then through the wire 243 to the negative feed wire 40 whereupon the motor 23 operates in a direction to rotate the propeller housing in a direction wherein the thrust of the propeller is upward thereby pushing the aircraft downward.

When the operator starts to turn the wheel 90 he sets the arm 168 of the angle set device 95 at the position indicating the angle at which he desires the propeller housings to cease rotating. As the propeller housing with which the device 95 is associated rotates, the contact arm 178 moves into engagement with the rheostat coil 174 whereupon current flows from the positive feed wire 39 through the wire 179 to the contact arm 178 thence through the rheostat coil 174 to the wire 176 through which it flows to the solenoid coil 151 of the angle set device 95. From the solenoid coil 151 the current flows through the wire 182 to the contact track 162 and thence through the wire 180 to the negative feed wire 40 thereby energizing the solenoid coil 151. As the coil 151 is thus energized it attracts its associated core 154 thereto against the action of the spring 155' thereby swinging the member 155 about its pivot 156 and moving the arm 159 and the contact bar 166 therein towards the arm 168 and the contact bar 172 thereon. As the propeller housing continues to rotate more current passes from the contact arm 178 through the rheostat coil 174 to the solenoid coil 151 thereby energizing it to a greater degree whereupon the core 154 continues to move the arm 159 towards the arm 168 until the contact bar 166 of the arm 159 engages the contact bar 172 of the arm 168. When the contact bar 166 engages the contact bar 172 an electric circuit is completed from the negative feed wire 40 through the wire 180 to the contact track 162 of the angle set device 95. From the contact track 162 the current flows through the contact bar 166 to the contact bar 172 and thence through the contact track 164 and the wire 193 to one end of the solenoid coil 192 of the switch 96. From the solenoid coil 192 the current flows through the wire 194 to the positive feed wire 39 thereby energizing the solenoid coil 192 whereupon its associated core 191 is attracted thereto. As the core 191 is thus moved it moves the arm 190 which in turn swings the arm 184 about its pivot against the action of the spring 188 and as the arm 184 is thus moved it moves its associated contact bar 185 out of engagement with the contacts 186 and 187 thereby breaking the circuit to all the motors 23 whereupon they cease to rotate the propeller housings.

Should the switch 96 fail to operate to break the circuit to the motors 23 and they continue to operate and rotate the propeller housings the switches 99 associated with each of the propeller units will break the circuit to the motors 23 as previously described.

When the operator turns the wheel 90 to cause the aircraft to move upward the contact arm 131 of the automatic switch 94 engages the contact track 135 whereupon electric current will flow from the positive feed wire 39 through the wire 227 to the contact track 217 of the switch 99 and thence through the contact arm 216 to the contact 219 and then through the wire 226 to the terminal 223 of the motors 23. From the motor terminal 224 the current will return to the negative feed wire 40 through the wire 232 to the contact 106 of the individual switch 92, thence through the contact bar 104 thereof to the contact 107 from which it will flow through the wire 211 to the lead wire 210 to the contact 198 of the switch 97. From the contact 198 the current flows through the contact bar 196 to the contact 197 and thence through the wire 217 to the contact track 135 of the automatic switch 94, thence through the contact arm 131 thereof and the wire 242 to the contact 119 of the master hand switch 93. From the contact 119 the current flows through the contact bar 118 to the contact 120 and then through the wire 243 to the negative feed wire 40 whereupon the motor 23 operates in a manner to rotate the propeller housing in a direction wherein the thrust of the propeller is downward thereby pushing the aircraft upward.

When the operator starts to turn the wheel 90 to direct the aircraft upward he sets the arm 167 of the angle set device 95 at the position indicating the angle at which he desires the propeller housings to cease rotating in the same manner as previously described in connection with the actuation of the various devices when the operator rotates the wheel 90 to direct the aircraft downward. As the propeller housing with which the device 95 is associated rotates the contact arm 178 moves into engagement with the rheostat coil 175 whereupon current flows from the positive feed wire 39 through the wire 179 to the contact arm 178 thence through the rheostat coil 175 to the wire 177 through which it flows to the solenoid coil 152 of the angle set device 95. From the solenoid coil 152 the current flows through the wire 183 to the contact track 162 and thence through the wire 180 to the negative feed wire 40 thereby energizing the solenoid coil 152. As the coil 152 is thus energized it attracts its associated core 154 thereto against the action of the spring 155' thereby swinging the member 155 about its pivot 156 and moving the arm 158 and the contact bar 165 thereon towards the arm 167 and the contact bar 171 thereon. As the propeller housing continues to rotate more current passes from the contact arm 178 through the rheostat coil 175 to the solenoid coil 152 thereby energizing it to a greater degree whereupon the core 154 continues to move the arm 158 towards the arm 167 until the contact bar 165 of the arm 158 engages the contact bar 171 of the arm 167. When the contact bar 165 engages the contact bar 171 an electric circuit is completed from the negative feed wire 40 through the wire 180 to the contact track 162 of the angle set device 95. From the contact track 162 the current flows through the contact bar 165 to the contact bar 171 and thence through the contact track 163 and the wire 204 to one end of the solenoid coil 203 of the switch 97. From the solenoid coil 203 the current flows through the wire 205 to the positive feed wire 39 thereby energizing the solenoid coil 203 whereupon its associated core 202 is attracted thereto. As the core 202 is thus moved it moves the arm 201 which in turn swings the arm 195 about its pivot against the action of the spring 199 and as the arm 195 is thus moved it moves the contact bar 196 thereon out of engagement with the contacts 197 and 198 thereby breaking the circuit to all of the motors 23 whereupon they cease to rotate the propeller housings. Should the switch 97 fail to operate to break the circuit to the motors 23 and they continue to operate to rotate the propeller housings the switches 99 associated with each of the propeller units will break the circuit to the motors 23 as previously described.

When one of the individual control switches is moved to cause operation of its associated motor 23 the contact bars 104 and 105 and the contact bars 110 and 112 are moved to a position wherein they do not bridge their associated contacts thereby cutting out the effect of the automatic switch 94, the master hand switch 93 and the mercury switch 100.

When the operator desires to turn one of the propeller housings to cause the associated propeller to thrust upward he moves the contact arm 101 of the associated switch 92 into engagement with the contact track 102 thereof whereupon current will flow from the negative feed wire 40 through the wire 235 to the contact arm 101. From the contact arm 101 the current flows through the contact track 102, and the wire 230 and the wire 229 to the terminal 222 of the motor 23. From the motor terminal 221 the current returns through the wire 225 to the contact 218 of the switch 99 and then through the contact arm 216 and the contact track 217 and the wire 227 to the positive feed wire 39 thereby causing operation of the motor 23. When the operator desires to turn the propeller housing in the opposite direction he moves the contact arm 101 of the switch 92 into engagement with the contact track 103 thereof, whereupon current will flow from the negative feed wire 40 through the wire 235 to the contact arm 101. From the contact arm 101 the current flows through the contact track 103, the wire 233 and the wire 232 to the terminal 224 of the motor 23. From the motor terminal 223 the current returns through the wire 226 to the contact 219 of the switch 99 and then through the contact arm 216 and the contact track 217 and the wire 227 to the positive feed wire 39 thereby causing operation of the motor 23.

When the master hand switch is moved to cause operation of the motors 23 the contact bars 118 and 125 thereof are moved to a position wherein they do not bridge their associated contacts 119 and 120 and 126 and 127 respectively thereby cutting out the effect of the automatic switch 94 and the mercury switch 100 on the motors 23.

When the operator desires to turn all the propeller housings to cause the propeller to thrust upward he moves the contact arm 118 of the master switch 93 into engagement with the contacts 121 and 122 thereof whereupon current flows from the positive feed wire 39 through the wires 227, the switches 99 and the wires 225 to the terminals 221 of the motors 23. From the terminals 222 of the motors 23 the current returns through the wires 229 to the contacts 109 of the switches 92 and then through the contact bars 105 thereof to the contact 108, thence through the wires 209 to the feed wire 208. From the feed wire 208 the current flows through the switch 96 to the wire 206, thence through the wire 244 to the contact 121 of the master switch 93 and then through the contact bar 118 to the contact 122 from which it flows through the wire 245 to the negative feed wire 40 thereby causing operation of the motors 23 in a direction to turn the propeller housings to a position wherein the propellers will thrust upward.

When the operator desires to turn all the propeller housings to cause the propellers to thrust downward he moves the contact arm 118 of the master switch 93 into engagement with the contacts 123 and 124 thereof whereupon current flows from the positive feed wire 39 through the wires 227, the switches 99 and the wires 226 to the terminals 223 of the motors 23. From the motor terminals 224 the current returns through the wires 232 to the contacts 106 of the switches 92 and then through the contact bars 110 thereof to the contacts 107, thence through the wires 211 to the feed wire 210. From the feed wire 210 the current flows through the switch 97 to the wire 207, thence through the wire 246 to the contact 123 of the master switch 93 and then through the contact bar 118 to the contact 124 from which it flows through the wire 247 to the negative feed wire 40 thereby causing operation of the motors 23 in a direction to turn the propeller housing to a position wherein the propellers will thrust downward.

When operating the motors 23 through the medium of the master switch 93 the operator may adjust the angle set device 95 to stop the motors 23 when the propeller housings reach the desired angle as previously described.

When it is desired to use the mercury switch 100 to automatically maintain the aircraft on an even keel horizontally all the switches 92, 93 and 94 are set and maintained in their intermediate positions as shown in Fig. 4 and the switch 240' is closed. Whereupon when the bow of the aircraft tilts upward and electric circuit is established from the negative feed wire 40 through the wire 243, through the contacts 120 through the contact bar 118 and the contact 119 of the master switch 93 to the wire 242, thence to the contact arm 131 of the automatic switch 94. From the contact arm 131 through the contact 133 and the wire 241 to the contact 127 of the master switch 93, through the contact bar 125 thereof to the contact 126 and thence through the wire 240 to the terminal 138 of the mercury switch 100. Then through the mercury to the terminal 139 and thence to the lead wire 237. The contacts 114 of the switches 92 which are associated with the forward propeller units are connected by the wire 236 to the lead wire 237 (see Fig. 4) while a similar wire 238 connects the lead wire 239 with the contacts 116 of the switches 92 which are associated with the rear propeller units (see Fig. 2). It will therefore be apparent that when the mercury of the device 100 bridges the contacts 138 and 139 the motors 23 associated with the forward propeller units will operate to turn their associated propeller housings to a position wherein the thrust of their associated propellers will be downward while the motors 23 associated with the rear propeller units will operate to turn their associated propeller housing to a position wherein the thrust of their associated propellers will be upward.

When the bow of the aircraft tilts downward an electric circuit is established from the negative feed wire 40 to the terminal 140 of the mercury switch 100 in the same manner as previously described in connection with the terminal 138. Then through the mercury to the terminal 141 and thence to the lead wire 239.

The contacts 116 of the switches 92 which are associated with the forward propeller units are connected by the wire 238 to the lead wire 239 (see Fig. 4) while a similar wire 236 connects the lead wire 239 with the contacts 114 of the switches 92 which are associated with the rear propeller units (see Fig. 2). It will therefore be apparent that when the mercury of the device 100 bridges the contacts 140 and 141 the motors 23 associated with the forward propeller units will operate to turn their associated propeller housings to a position wherein the thrust of their associated propellers will be upward while the motors 23 associated with the rear propeller units will operate to turn their associated propeller housings to a position wherein the thrust of their associated propellers will be downward.

The motors 23 associated with the propeller units intermediate the forward and rear propeller units are not operable by the mercury switch device 100.

For returning the propeller units to their normal horizontal positions after they have been moved one way or the other by the mercury switch 100 I provide a second mercury switch 255. The switch 255 includes a container 256 having a quantity of mercury 257 therein which when the aircraft is on an even keel horizontally is adapted to bridge a pair of spaced contacts 258 and 259. The contact 258 is connected by a wire 260 to the wire 240 and the contact 259 is connected by a wire 261 to a contact ring 262 on the base 173 of the device 98. Coaxial with the contact ring 262 I provide a pair of spaced segmental contact rings 263 and 264. Positioned between a pair of adjacent ends of the contact segments 263 and 264 I provide a contact bar 265 which is mounted on a portion of the rotatable propeller housing 20. The segment 263 is connected by a wire 266 to the lead wire 237 and the segment 264 is connected by a wire 267 to the lead wire 239.

When the mercury switch 100 causes the motors 23 to rotate the propeller housings the contact bar 265 engages one of the segment rings 263 or 264 whereupon when the altered position of the propellers force the aircraft back to an even keel the mercury 257 of the switch 255 bridges the contacts 258 and 259 whereupon a circuit is completed to the motors 23, which causes the motors to rotate their associated housings back to their normal positions. When the housings return to their normal positions the contact bar 265 moves out of engagement with the segment track with which it has been engaged thereby breaking the circuit to the motors 23.

In Fig. 7 I have shown a slight modification of my invention wherein one of the propeller units is operated from an internal combustion engine 270 instead of the electric motors 19 and 23. As shown the propeller drive shaft is driven by the engine 270 through the medium of a forward and reverse transmission 271. The engine 270 includes a fuel control valve 272 including an operating lever 273. For normally retaining the valve 272 in a closed position I provide a coiled spring 274 having one end connected to the lever 273 and having the other end suitably anchored. Connected to the lever 273 opposite the spring 274 I provide a solenoid core member 275 which is adapted to be acted upon by a solenoid coil 276.

The transmission 271 includes a pivoted operating lever 277 having a contact bar 278 thereon and insulated therefrom which is adapted to engage contact tracks 279, 280 and 281. Slackly connected to the lever 277 as at 282 I provide a pair of opposed solenoid cores 283 and 284 which are insulated from one another. The core 283 is associated with a solenoid coil 285 and the core 284 is associated with a solenoid coil 286.

The housing-turning pinion 22 is secured to a shaft 287 having a pair of spaced gears 288 and 289 secured thereto. The gear 289 meshes with an idler gear 290. Slidably mounted on the shaft 18 to rotate therewith I provide a gear 291 which in an inoperative position is positioned intermediate the gears 288 and 289 and which is adapted in one position to mesh with the gear 288 and in another position to mesh with the idler gear 290. For shifting the gear 291 I provide a lever 292 which is pivoted intermediate its length as at 293 and is adapted to be retained in a neutral position by a pair of opposed springs 294. One end of the lever 292 is slackly connected to a portion of the gear 291 as at 295 and the opposite end is slackly connected as at 296 to a pair of oppositely extending solenoid core members 297 and 298 which are insulated from one another. The core 297 is associated with a solenoid coil 299 and the core 298 is associated with a solenoid coil 300. The various elements of the device shown in Fig. 7 are adapted to be controlled by the control devices 32, 33, 34, 35, 36, 92, 93, 94, 95, 96, 97, 98 and 99 previously described. Therefore one end of the speed control solenoid coil 276 connected to the wire 71 the circuit through which is controlled by an individual speed control switch 32 and the master speed control switch 34. The opposite end of the solenoid coil 276 is connected by a wire 301 to the negative feed wire 40. Thus it will be apparent that when either the master speed control switch 34, the individual speed control switch 32 or the automatic speed control switch 36 is actuated to cause more current to be delivered through the wire 71 as previously described, the solenoid coil 276 will be more energized thereby attracting its associated core 275 towards it, whereupon the lever 273 will be moved towards an open position against the action of the spring 274, and whereupon more fuel will be delivered to the engine 270 causing it to operate faster and speed up its associated propeller. When the speed control switches are actuated to deliver less current to the wire 71 the coil 276 will be deenergized whereupon the spring 274 will move the lever 273 to actuate the valve 272 towards a closed position.

One end of the solenoid coil 286 is connected to the wire 80 and one end of the solenoid coil 285 is connected to the wire 80'. The other end of the coil 286 is connected by a wire 302 to the contact track 281 and the other end of the coil 285 is connected by a wire 303 to the contact track 281. The contact track 279 is connected by a wire 304 to the positive feed wire 39. Thus it will be apparent that when current is delivered through the wire 80 to the solenoid coil 286 by operation of either the master control switch 35 or its associated individual control switch 33 the solenoid coil 286 will be energized thereby attracting its associated core 284 towards it which in turn will swing the lever 277 to a position wherein the transmission 271 will cause the shaft 18 to rotate in a direction to operate the propeller to drive the aircraft forward. When either the control switch 35 or the control switch 33 is actuated to deliver current to the wire 80' the solenoid coil 285 will be energized thereby attracting its associated core 283 towards it which in turn will swing the lever 277 to a position wherein the transmission 271 will cause the shaft 18 to rotate in a direction to operate the propeller to drive the aircraft rearwardly. When the lever 277 has traveled to its extreme forward position the contact bar 278 thereon moves out of engagement with the contact track 281 thereby breaking the circuit through the solenoid coil 286 but remains in engagement with the contact track 280. When the lever 277 has traveled to its extreme rearward position the contact bar 278 thereon moves out of engagement with the contact track 280 thereby breaking the circuit to the solenoid coil 285 but remains in engagement with the contact track 281.

One end of the solenoid coil 299 is connected to the wire 229, the current to which is controlled by an individual switch 92, the master switch 93, the automatic switch 94 and the mercury switch 100. The opposite end of the coil 299 is connected by a wire 299' to the positive feed wire 39.

When either the individual switch 92, the master control switch 93, the automatic switch 94, or the mercury switches 100 and 255 operate to deliver current to the wire 229, as previously described, the solenoid core 299 is energized and attracts its associated core 297 towards it, which in turn swings the lever 292 about its pivot to a position wherein the gear 291 meshes with the gear 288. When the gear 291 meshes with the gear 288 and the engine 270 is operating, it rotates the gear 288, the shaft 287 and the pinion gear 22 in a direction to rotate the propeller housing 20 to a position wherein the associated propeller thrusts downward.

One end of the solenoid coil 300 is connected to the wire 232, the current to which is controlled by an individual switch 92, the master switch 93, the automatic switch 94 and the mercury switch 100. The opposite end of the solenoid coil 300 is connected by a wire 300' to the positive feed wire 39.

When the control switches are actuated to deliver current to the wire 232 as previously described the solenoid core 300 is energized and attracts its associated core 298 towards it which in turn swings the lever 292 about its pivot to a position wherein the gear 291 meshes with the idler gear 290. When the gear 291 meshes with the idler gear 290 and the engine 270 is operating it rotates the gear 289, the shaft 287 and the pinion gear 22 in a direction to rotate the propeller housing 20 to a position wherein the associated propeller thrusts upward.

From the foregoing description it will be apparent that I have provided a novel automatic steering and elevating mechanism for aircraft which is simple in construction and highly efficient in use.

Having thus described my invention, I claim:

1. In an aircraft, a body having a plurality of driving propellers on each side thereof, a rudder on said aircraft and elevating fins on said aircraft, means to operate said rudder, drive means to operate said propellers, means to support said propellers whereby the angle of thrust of said propellers may be altered, means to control the speed of all the propellers in unison, selective means to control the speed of the propellers on the opposite sides of the aircraft, means to control the direction of thrust of the propellers and automatic means operable by said rudder operated means to control said selective means.

2. In an aircraft, a body having a driving propeller on each side thereof and a rudder, means to drive said propellers, steering means to operate said rudder and means operated by said steering means when said rudder is operated to turn said aircraft so that said propellers on the side toward which said aircraft in turning will be slowed down.

3. In an aircraft, a body having a driving propeller on each side thereof and a rudder, means to drive said propellers, means to operate said rudder to steer the aircraft, actuating means whereby when said rudder is operated to turn said aircraft said propellers on the side away from which said aircraft in turning will be speeded up and means to cause automatic operation of said actuating means when the steering means is operated.

4. In an aircraft, a body having a plurality of driving propellers on each side thereof and a rudder, means to drive said propellers, steering means to operate said rudder, and means connected to said rudder steering means and operable when said rudder is operated to turn said aircraft to thereby slow down the propellers on the side toward which said aircraft is turning and to simultaneously speed up the propellers on the opposite side.

5. In an aircraft, a body having a plurality of driving propellers on each side thereof, means to drive said propellers, means to support said propellers whereby the angle of thrust of said propellers may be altered, elevating fins on said aircraft, means to operate said elevating fins, and automatic means actuated by said operating means when said fins are shifted to steer said aircraft downwardly thereupon to cause said propeller support to be shifted so that propeller thrust is upward.

6. In an aircraft, a body having a plurality of driving propellers on each side thereof, means to drive said propellers, means to support said propellers whereby the angle of thrust of said propellers may be altered, elevating fins on said aircraft means to operate said elevating fins and automatic means actuated by said operating means when said fins are shifted to steer said aircraft upwardly to thereupon cause said propeller supports to be shifted so that the propeller thrust is downward.

7. In an aircraft, a body having a plurality of driving propellers on each side thereof, means to drive said propellers, means to support said propellers whereby the angle of thrust of said propellers may be altered, elevating fins on said aircraft, means to operate said elevating fins, and means operable automatically when said fins are actuated to cause said aircraft to move upwardly to thereby cause said propellers to thrust downward, and when said fins are actuated to cause said aircraft to move downwardly to thereby cause said propellers to thrust upwardly.

8. In an aircraft, a body having a plurality of propellers mounted to swivel thereon, means to drive said propellers, a master control for controlling all of said driving means, an automatic control for controlling each of said driving means, an individual control for controlling each propeller independently, a master control means for simultaneously controlling the swivelling movement of all of the said propellers and individual control means operable independently of said last mentioned master control means for controlling each propeller.

9. In an aircraft, a body having a plurality of propellers thereon, means to drive said propellers at varying speeds, a rudder, means to move said rudder and means operated by the rudder moving means when the rudder is moved to vary the speed of certain of said propellers.

10. In an aircraft, a body having a plurality of propellers on each side thereof, means to drive said propellers, a rudder on said aircraft, steering means to operate said rudder, means to speed up or slow down said propellers in unison, automatic means whereby when said steering means is operated to turn said aircraft said propellers on the side towards which said aircraft is turning will be slowed down and said propellers on the opposite side will be speeded up, and means whereby when said automatic means is actuated the effect of said individual and unison means on said propellers will not be effective.

11. In an aircraft, a body having a plurality of driving propellers on each side thereof, a rudder on said aircraft and elevating fins on said aircraft drive, means to operate said propellers, means to support said propellers whereby the angle of thrust of said propellers may be altered, steering means to operate said rudder and means to actuate said elevating fins, means whereby when said rudder is actuated to turn said aircraft the speed of said propellers will be altered and means whereby when said elevating fin actuating means is operated to direct said aircraft upward or downward the angle of the thrust of said propellers will be altered to assist said fins in maneuvering said aircraft.

12. In an aircraft, a body having a plurality of propellers on each side thereof, means to drive said propellers, a rudder on said aircraft, steering means to operate said rudder, means to speed up or slow down said propellers individually, means to speed up or slow down said propellers in unison, automatic means whereby when said steering means is operated to turn said aircraft said propellers on the side towards which said aircraft is turning will be slowed down and said propellers on the opposite side will be speeded up, means whereby when said automatic means is actuated the effect of said individual and unison means on said propellers will not be effective, and means whereby when said individual means is actuated the effect of said automatic and unison means on said propellers will not be effective.

13. In an aircraft, a body having a plurality of propellers on each side thereof, means to drive said propellers, a rudder on said aircraft, steering means to operate said rudder, means to speed up or slow down said propellers individually, means to speed up or slow down said propellers in unison, automatic means whereby when said steering means is operated to turn said aircraft said propellers on the side towards which said aircraft is turning will be slowed down and said propellers on the opposite side will be speeded up, means whereby when said automatic means is actuated the effect of said individual and unison means on said propellers will not be effective, means whereby when said individual means is actuated the effect of said automatic and unison means on said propellers will not be effective and means whereby when said unison means is actuated the effect of said automatic means and said individual means on said propellers will not be effective.

14. In an aircraft, a body having a plurality of driving propellers on each side thereof, a rudder on said aircraft and elevating fins on said aircraft drive, means to operate said propellers, means to support said propellers whereby the angle of thrust of said propellers may be altered, steering means to operate said rudder and means to actuate said elevating fins, means whereby when said rudder is actuated to turn said aircraft said propellers on the side towards which said aircraft is turning will be slowed down and said propellers on the opposite side will be speeded up, means whereby when said elevating fin actuating means is operated to direct said aircraft upward or downward the angle of the thrust of said propellers will be altered to assist said fins in maneuvering said aircraft, selectively actuated automatic means whereby when said aircraft noses upward or downward the angle of thrust of said propellers will be altered to urge said aircraft in the opposite direction, and means whereby when said aircraft returns to an even longitudinal keel, said propellers will be returned to their normal position.

CHARLES S. HALL.